H. CARLE.
SHELL MACHINE.
APPLICATION FILED JAN. 18, 1916.
1,286,938.
Patented Dec. 10, 1918.
12 SHEETS—SHEET 1.
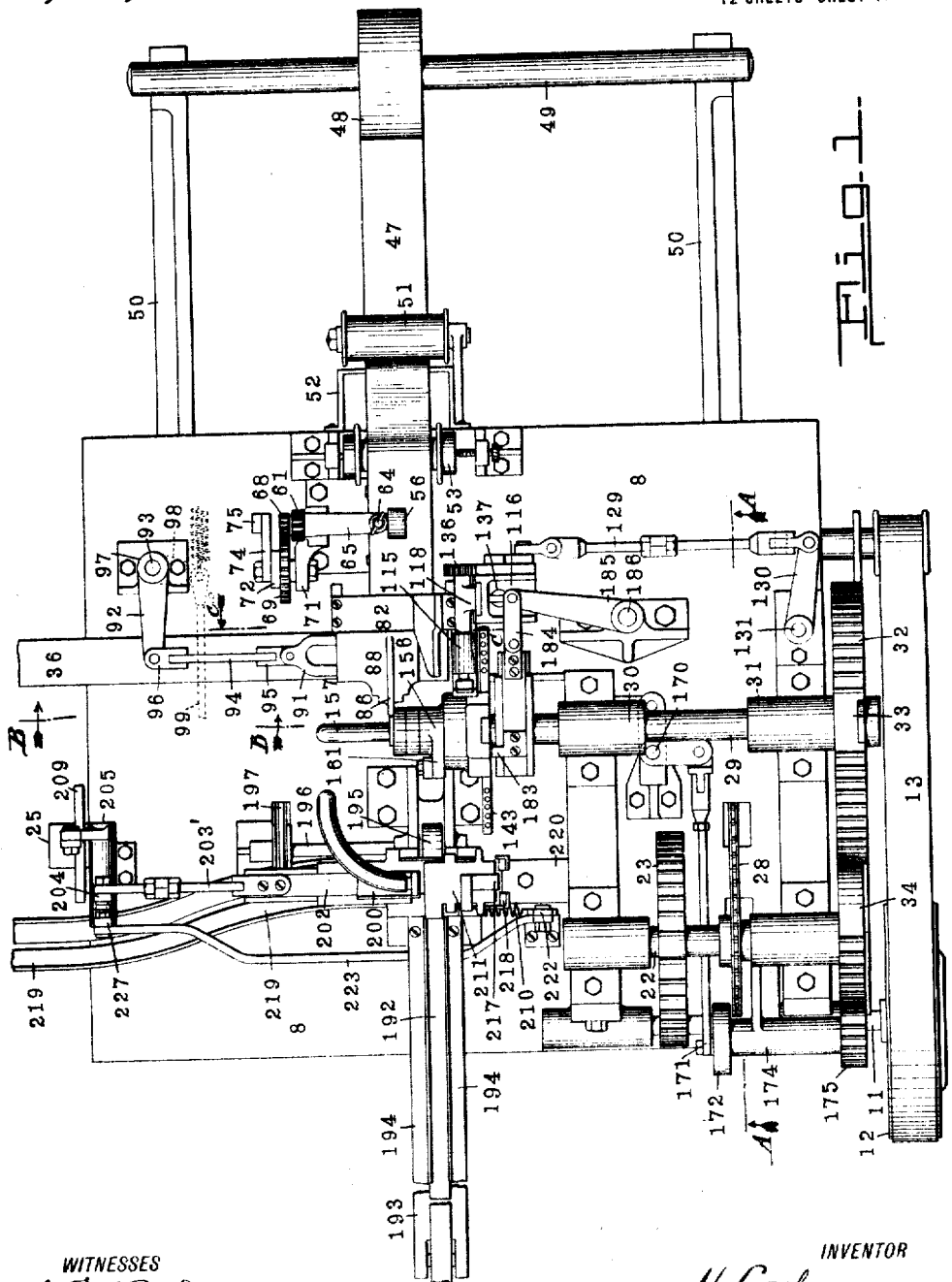
WITNESSES
INVENTOR
H. Carle
BY
ATTORNEYS

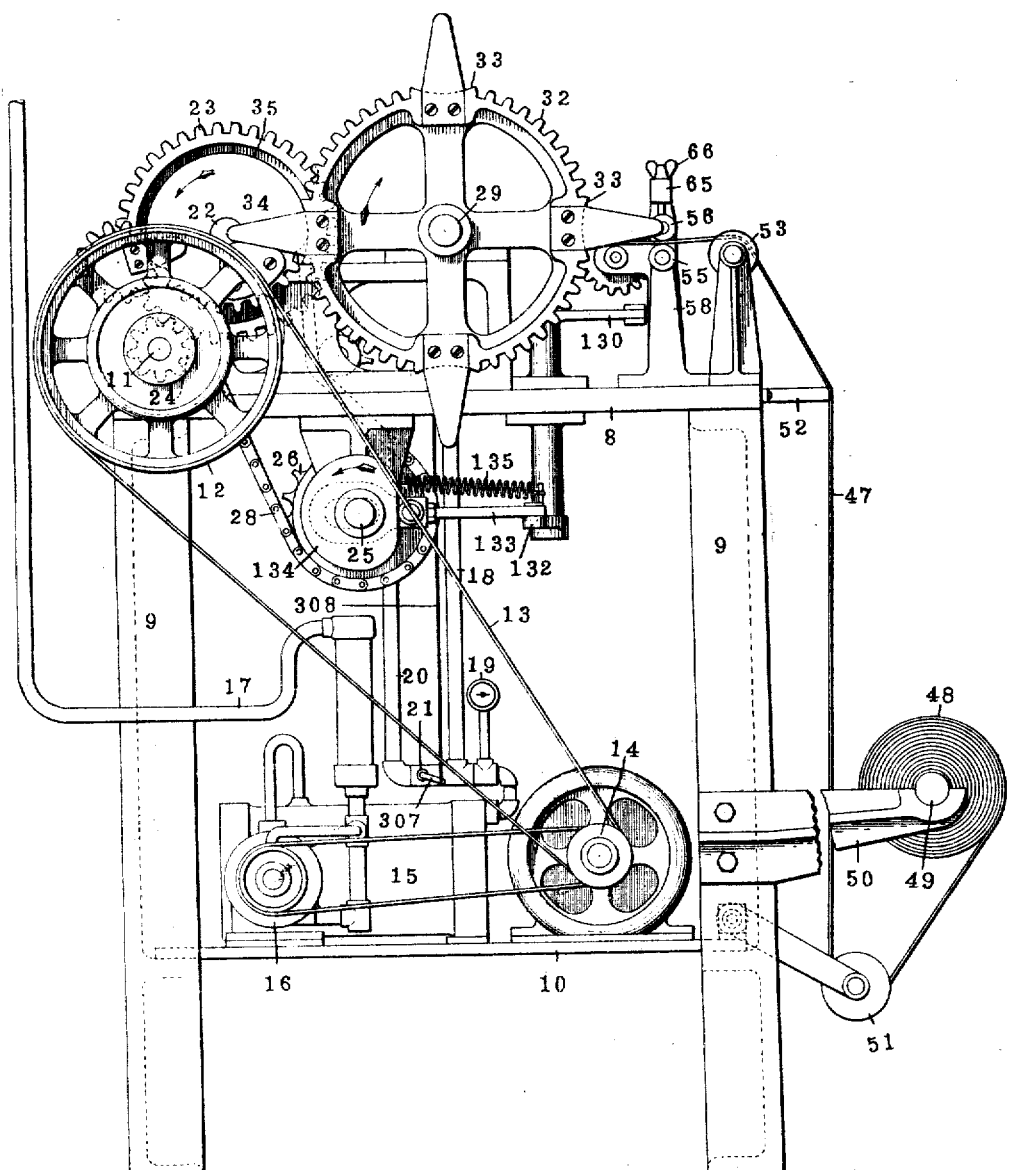

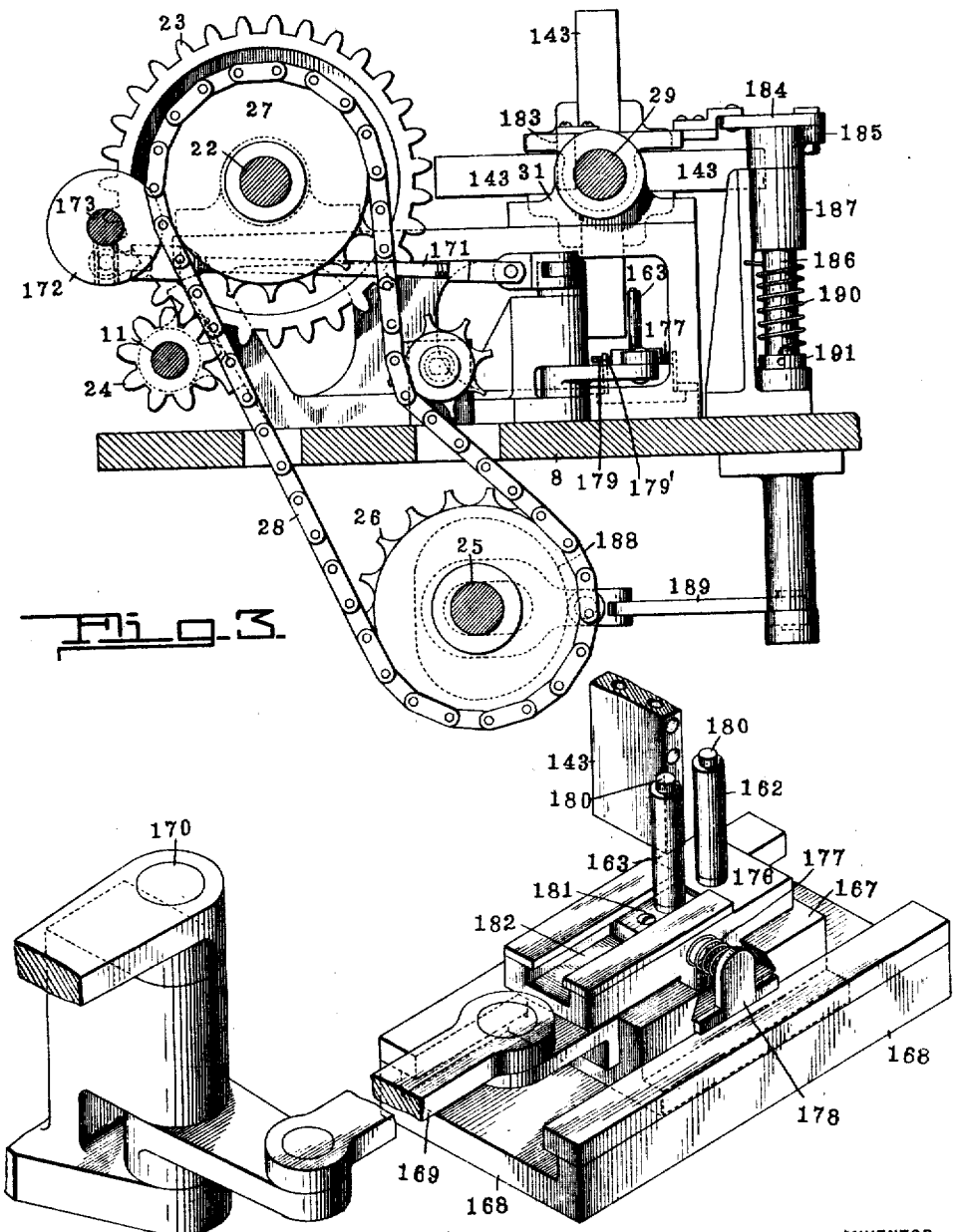

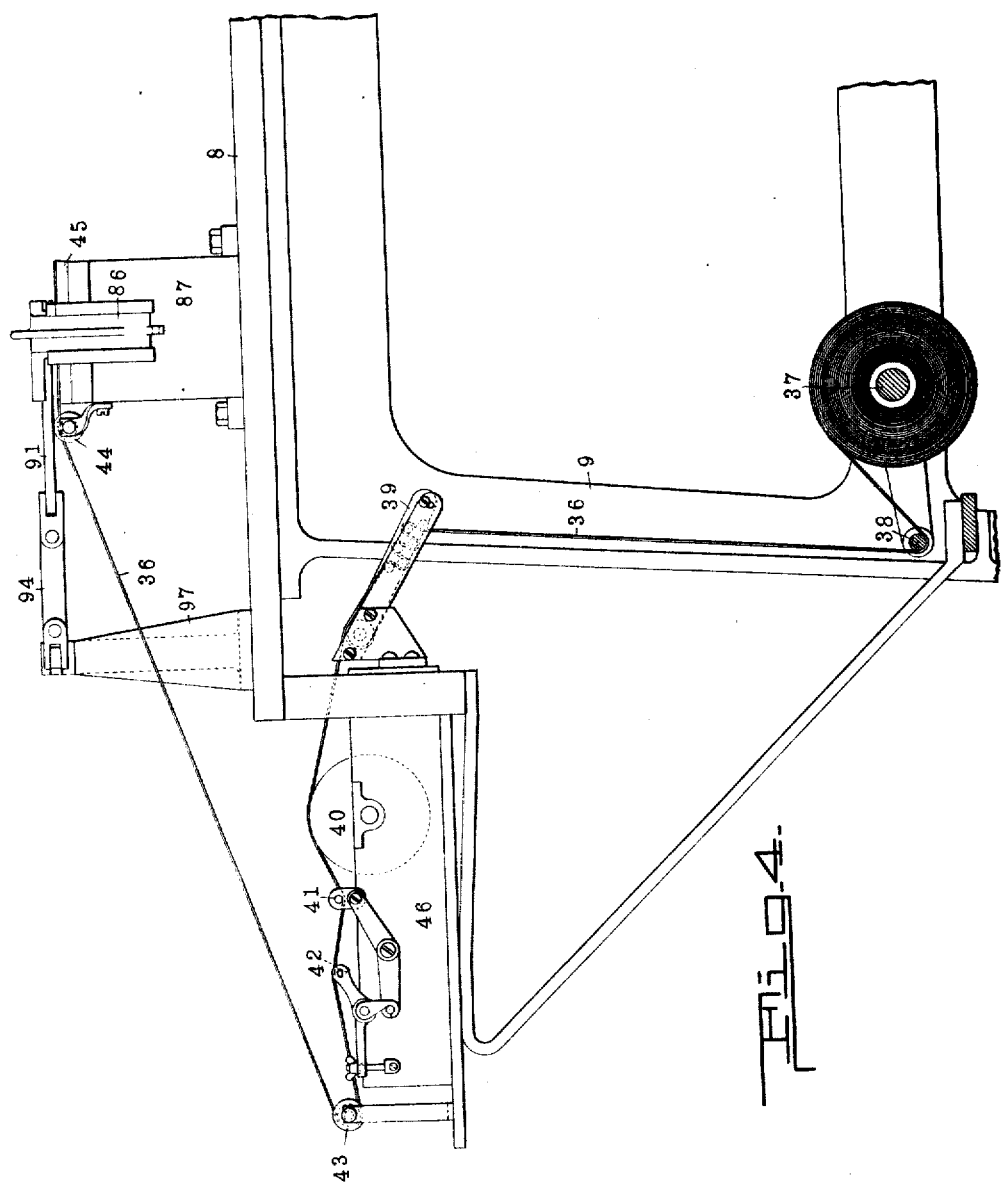

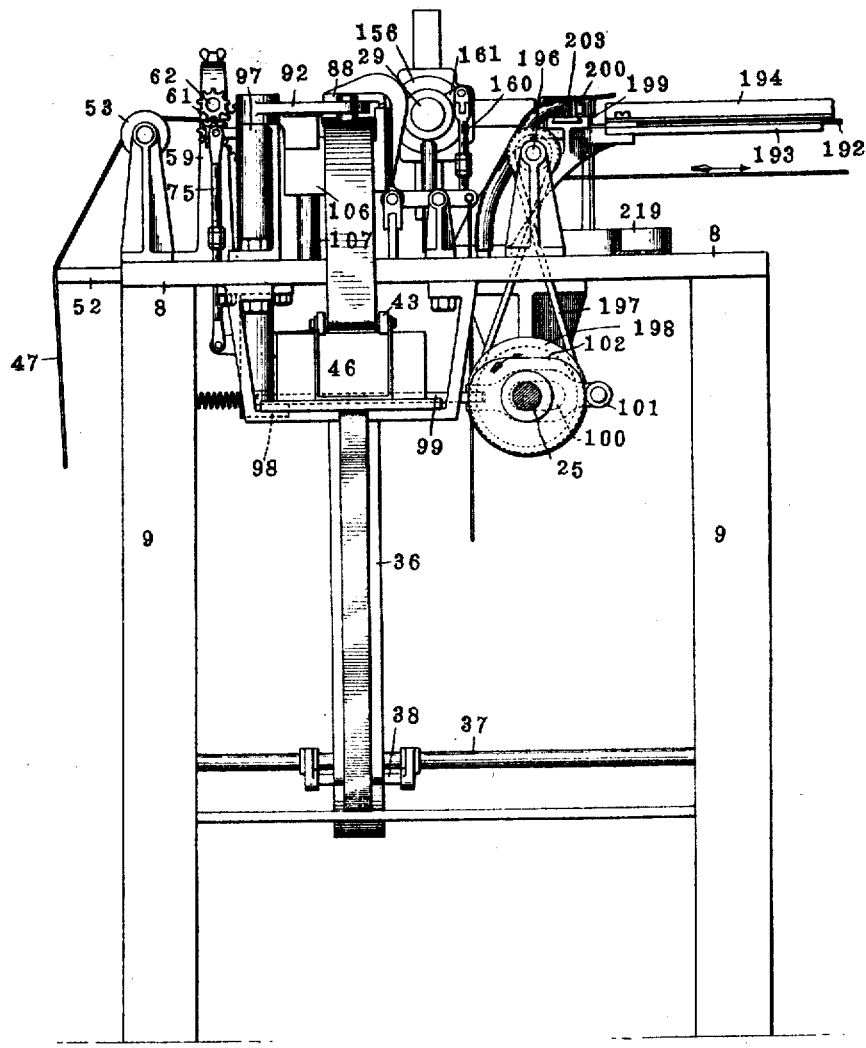

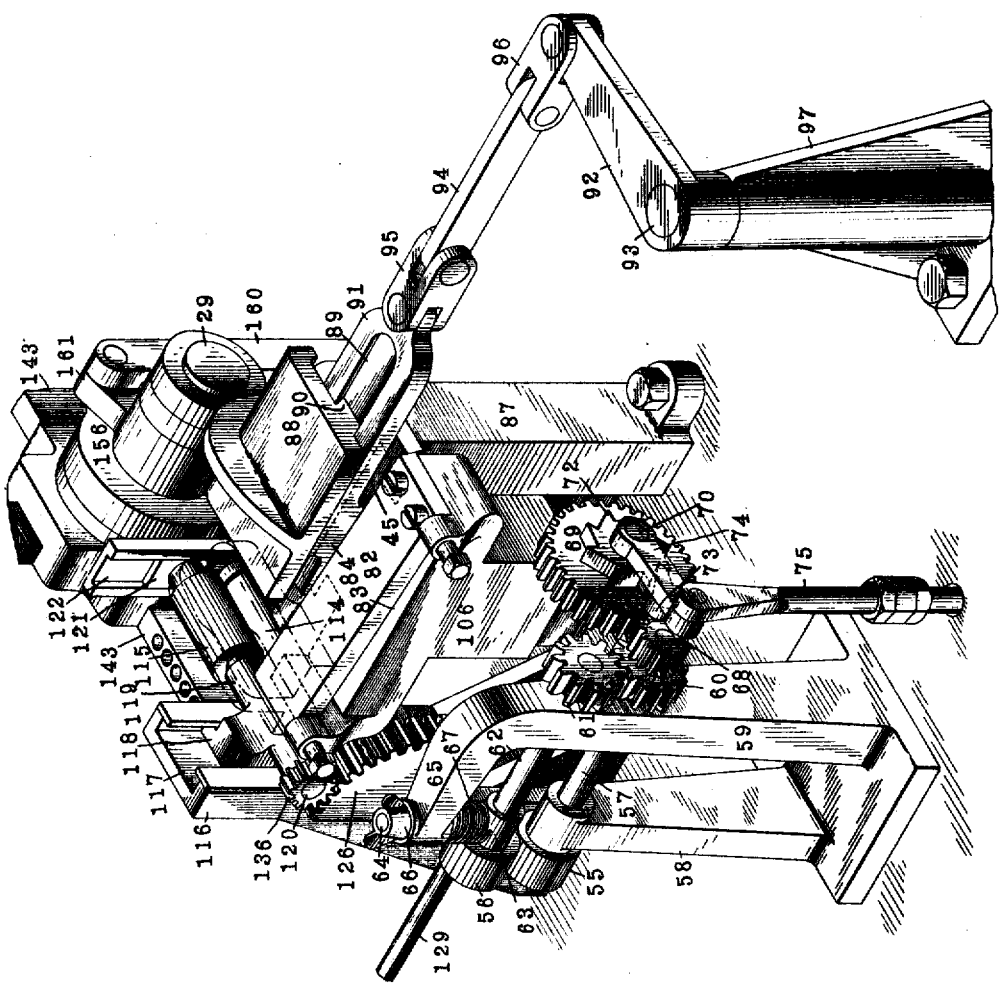

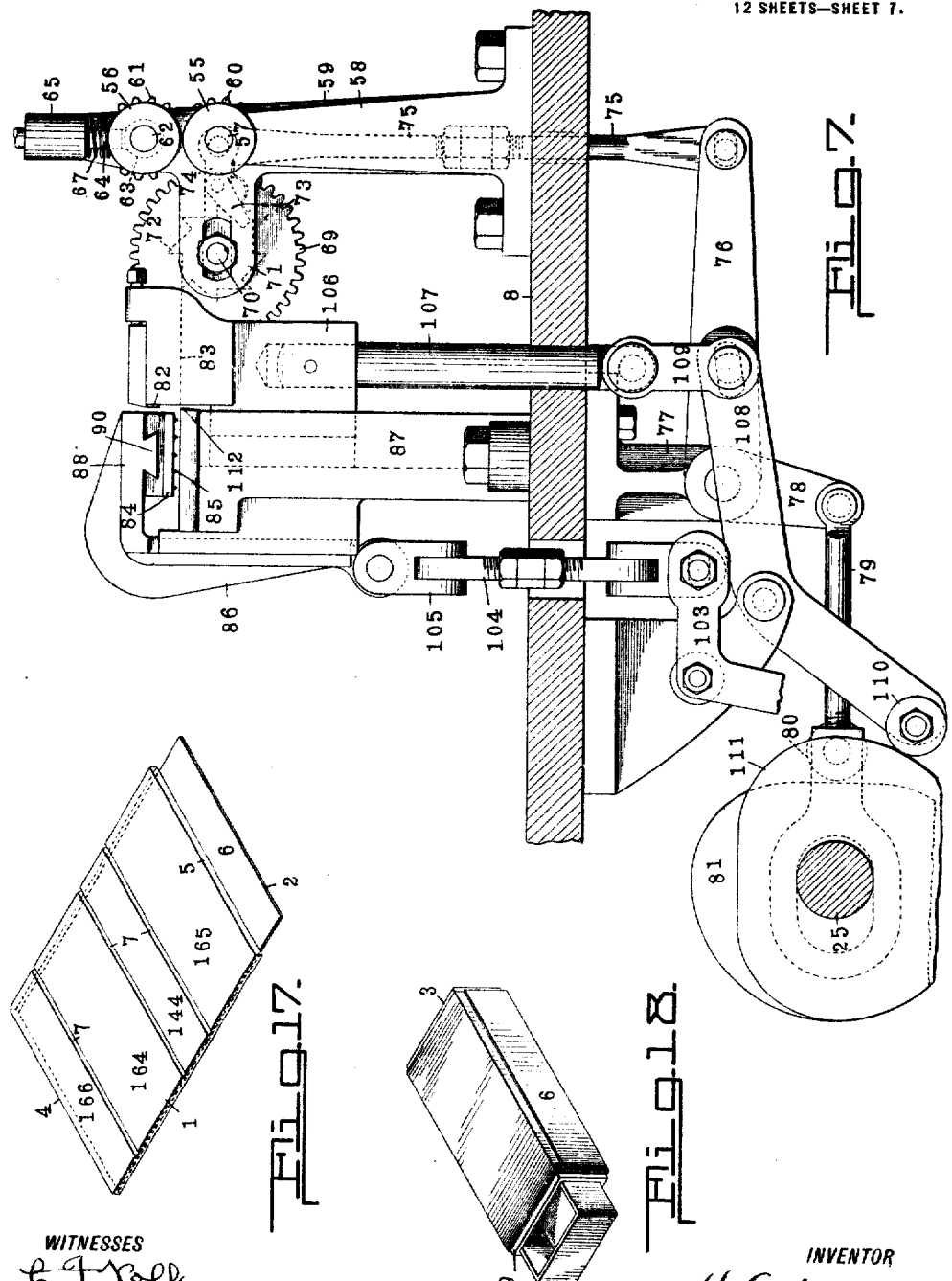

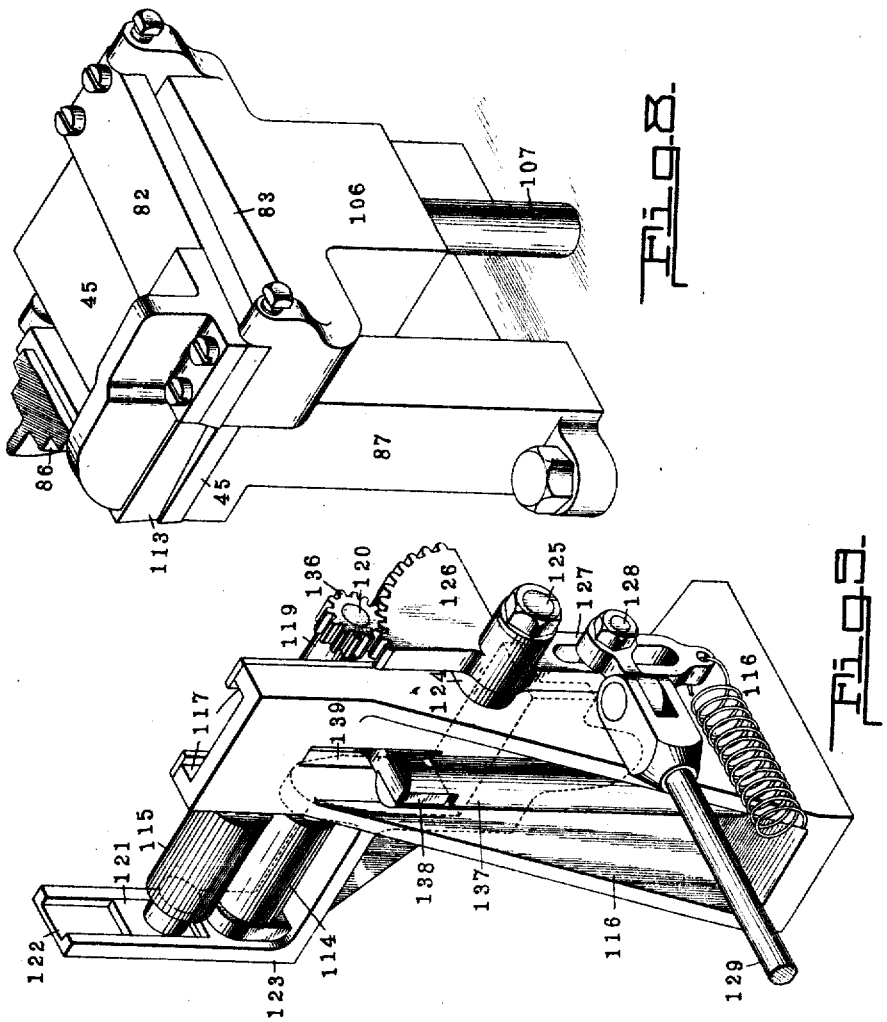

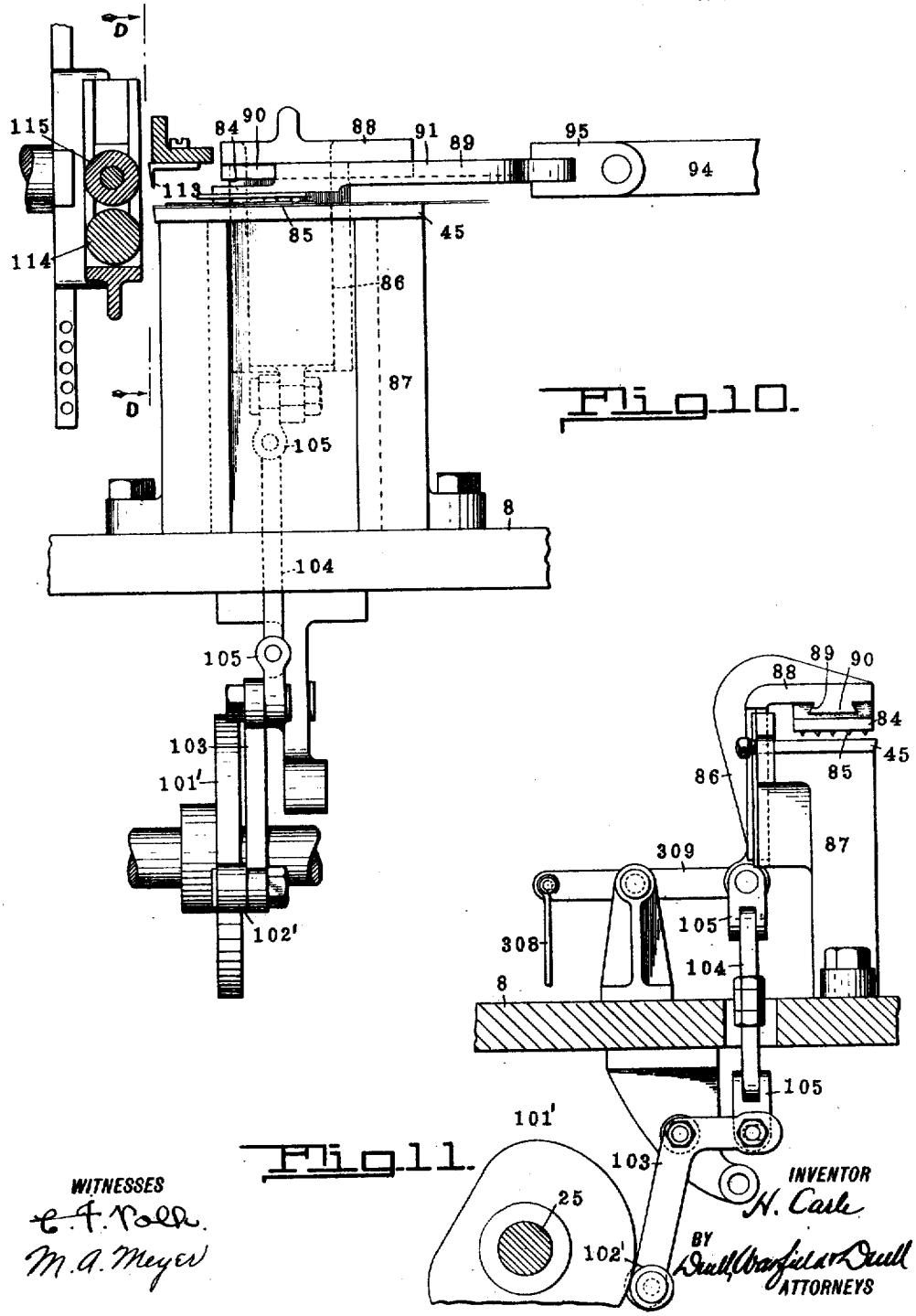

H. CARLE.
SHELL MACHINE.
APPLICATION FILED JAN. 18, 1916.

1,286,938.

Patented Dec. 10, 1918.
12 SHEETS—SHEET 11.

WITNESSES

INVENTOR
H. Carle
BY
Dull, Warfield & Dull
ATTORNEYS

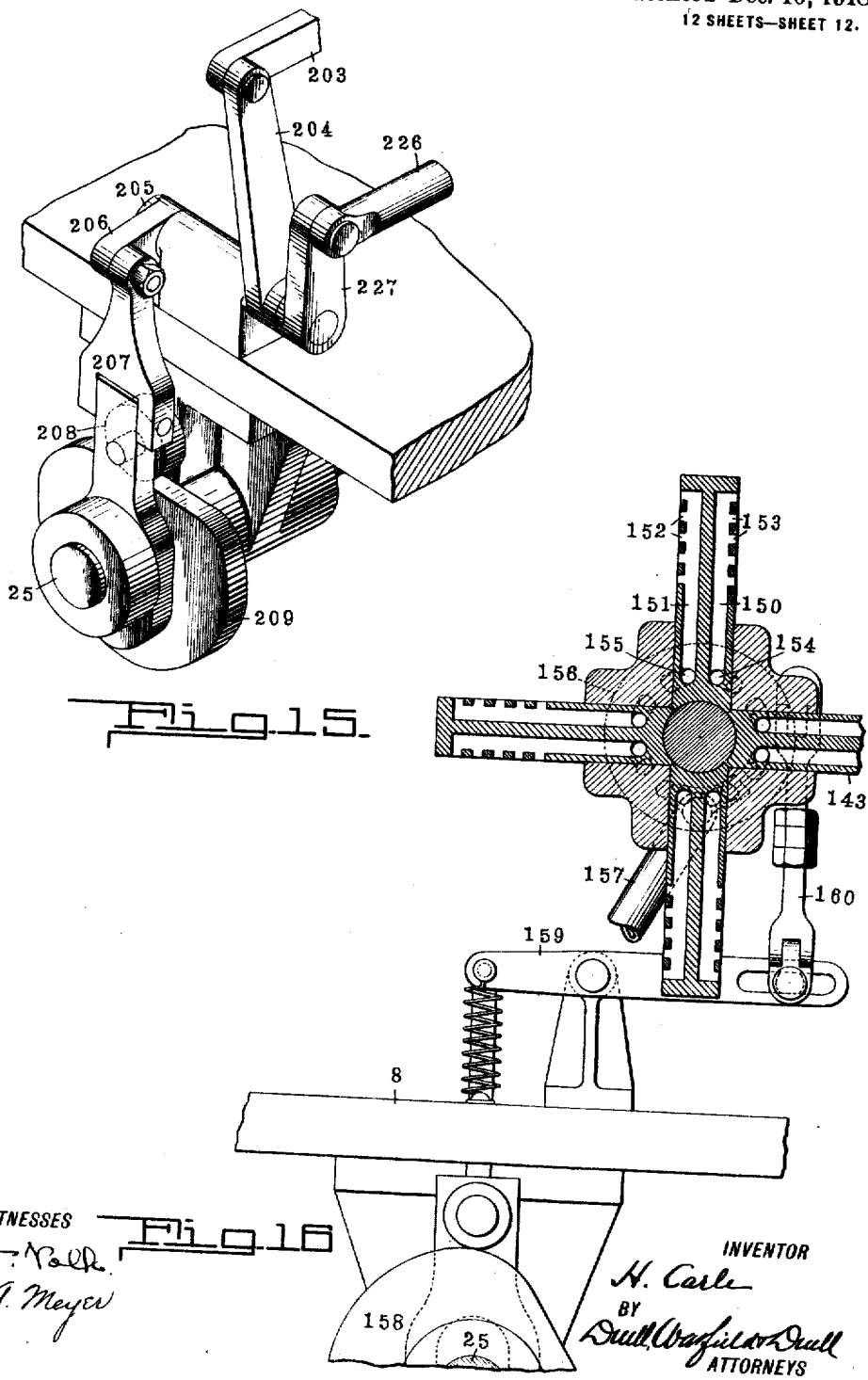

UNITED STATES PATENT OFFICE.

HAROLD CARLE, OF BUFFALO, NEW YORK, ASSIGNOR TO F. N. BURT COMPANY, LIMITED, OF BUFFALO, NEW YORK, A CORPORATION OF ONTARIO, CANADA.

SHELL-MACHINE.

1,286,938.  Specification of Letters Patent.  Patented Dec. 10, 1918.

Application filed January 18, 1916. Serial No. 72,679.

*To all whom it may concern:*

Be it known that I, HAROLD CARLE, a subject of the King of Great Britain, residing at Buffalo, in the county of Erie and State of New York, have invented certain new and useful Improvements in Shell-Machines, of which the following is a full, clear, and exact description, such as will enable others skilled in the art to which it appertains to make and use the same.

This invention relates to machines for making boxes, and with respect to its more specific features to machines of the character referred to for making shells or cases of paper, cardboard and similar material and assembling trays or drawers therewith.

One of the objects of the invention is the provision of a practical machine for making a composite paper blank suitable for folding into a shell or case.

Another object of the invention is the provision of efficient and simple mechanism for producing the blanks from a plurality of webs.

Another object of the invention is the production of an improved device for folding a blank into shell form.

Another object of the invention is the provision of efficiently operating mechanism for assembling shells and trays.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification, and wherein similar reference characters refer to similar parts throughout the several views,—

Figure 1 is a plan view of a machine illustrating one embodiment of the invention.

Fig. 2 is a front elevation of the machine.

Fig. 3 is a sectional elevation on the line A—A of Fig. 1.

Fig. 4 is a sectional elevation on the line B—B of Fig. 1.

Fig. 5 is a rear elevation of the machine.

Fig. 6 is a perspective view of certain cutting and feeding devices as seen from the rear of the machine.

Fig. 7 is a detail view, partly in section, of the body web feed rollers, and the feeding and cutting devices, as seen from the front of the machine.

Fig. 8 is a perspective view of the cutting devices, as seen from the right front corner of the machine.

Fig. 9 is a perspective view of certain composite-blank feeding rollers.

Fig. 10 is a sectional detail view on the line C—C of Fig. 1.

Fig. 11 is a sectional view on the line D—D of Fig. 10.

Fig. 13 is a perspective view of certain blank folding devices and their supporting mechanism.

Fig. 15 is a perspective view of the guiding mechanism for some of the elements of the tray feeding devices.

Fig. 16 is a sectional detail view of the formers around which the shells are folded with some associated parts.

Fig. 17 is a perspective view of the blank made by the machine and which is to be folded into the form of a shell.

Fig. 18 is a perspective view of the finished and partly assembled shell and tray.

Figure 12:
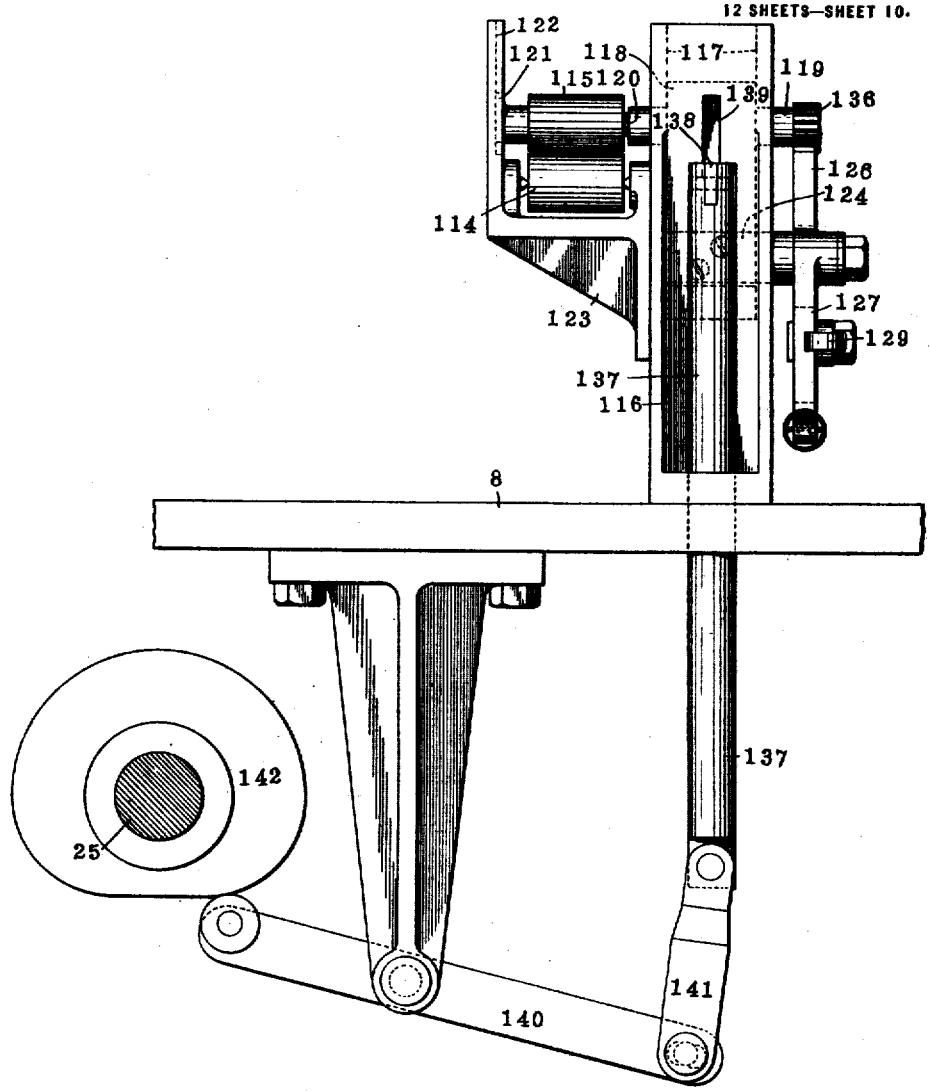
Fig. 12 is a view of the feeding rollers of Fig. 9 from the front of the machine.
Figure 14:
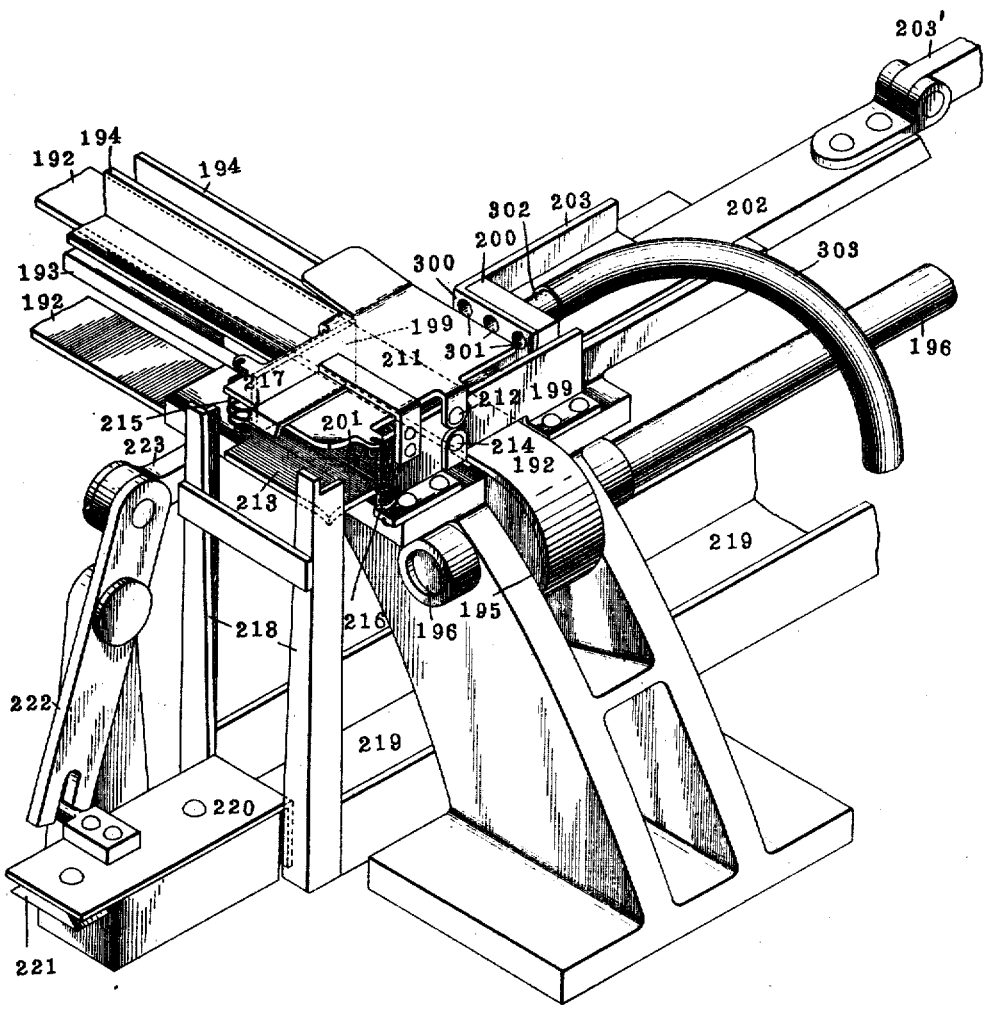
Fig. 14 is a perspective view of the tray feeding devices.

By the present invention a machine is produced which will automatically make a blank, fold the same into a rectangular tube, or shell, and insert a tray within the shell. The materials composing the shell are preferably some character of paper, such as cardboard or straw-board, forming the body-blank of the shell, and indicated at 1 in Fig. 17, and a relatively thin paper blank covering the body-blank, and indicated at 2 in the same figure. The body-blank may be exteriorly colored so that when the cover-blank is of such a dimension as to expose the body-blank, an ornamental appearance at the ends of the shell may be presented, as indicated for instance at 3 in Fig. 18. Preferably both the body-blank and the cover-blank are made from webs of such materials, the cover-blank being narrower than the body-blank so as to uncover the opposite ends thereof, as at 3, said cover-blank also extending to the edge 4 of the body-blank, and extending beyond the opposite edge 5 so as to provide a flap 6 to be folded over the joint formed when the edges 4 and 5 are brought together by the folding mechanism.

While the invention contemplates the formation of the blanks from webs having perfectly plain and unobstructed faces, it is preferred to employ a body web which is longitudinally grooved along the lines which are to become the corners of the shell, as for instance indicated by the numerals 7 in Fig. 17, such grooves being formed by removal of the material of the web by an abrading device, such as a rotary emery wheel having an edge designed to form grooves of substantial width and depth, so that when the body-blank is folded, the outer corners of the shell will be relatively sharp. The cover web is of relatively thin paper, its outer surface being "slick" or otherwise ornamental so that the shell will present a nice appearance. In the present embodiment the shells are prismatic in cross-section, being preferably rectangular, and the composite-blank is a generally rectangular element, as illustrated in Fig. 17.

*Frame and main operating parts.*—The numeral 8 indicates the main supporting horizontal frame plate having legs 9 and a platform 10. A main drive shaft 11 is journaled in a bearing mounted on the plate 8, and is driven by a pulley 12 through the instrumentality of a belt 13 leading to a driving pulley of an electric motor 14 on the platform 10. Supported on the platform is a vacuum tank 15 and an air pump 16, said pump being also driven by the electric motor so as to establish sufficient degree of vacuum in the tank 15, the pipe 17 being the exhaust leading from the pump. The numeral 18 indicates a pipe leading from a certain turret valve, hereinafter referred to, to the vacuum tank, and 19 is a gage for indicating the degree of vacuum. The numeral 20 is a branch vacuum pipe leading to the vacuum tank and controlled by a valve 21.

At 22 is indicated a counter shaft having a large pinion 23 meshing with a smaller pinion 24 on the main drive shaft. The numeral 25 indicates a cam shaft which is driven from the counter shaft through the instrumentality of sprocket wheels 26 and 27 on these respective shafts and a chain 28.

At 29 is indicated a rotatable former shaft, or mandrel shaft, supported in suitable bearings 30 and 31 upstanding from the plate 8, the outer end of the shaft 29 having affixed thereto a mutilated gear 32 composed of four series of teeth alternating with concave portions 33. The gear 32 is designed to mesh with a mutilated gear 34 having a smooth circular portion 35 to coöperate with the concave faces 33, the proportions of the gears 32 and 34 being such that for every rotation of the gear 34, the shaft 29 will be rotated 90 degrees. The shaft 29 has four mandrels, or formers, affixed thereto and radially projecting therefrom at angles of ninety degrees to each other, and these formers are locked in stationary position opposite certain blank forming, blank folding, and tray feeding devices by the coöperating faces 33 and 35, as will hereinafter appear.

*Cover web supply.*—A supply of cover web 36 is mounted as a roll on a small roller 37 suitably supported on the machine frame, and this web extends beneath a slack producing roll 38, through a tension device 39, over a glue-applying roll 40, beneath a guide bar 41, over a scraper bar 42, around a guide roll 43, and thence over a flanged guide roller 44 to the upper face of a table 45, the table being preferably stationary and upstanding from the plate 8. The glue roll 40 rotates in a supply of glue or other suitable adhesive in a tank 46, the under and unsized face of the cover web being thereby coated with glue. On passing around the roll 43 the glued face of the cover web is presented uppermost and the end of this web lies upon the table 45 with its glued face uppermost.

*Body web supply and feed.*—The body web 47 is supported in a coil 48 on a roller 49 supported in brackets 50 fastened to the main frame, and from the coil 48 the body web passes beneath a slack producing roll 51, past a smooth guiding abutment 52, thence over a flanged guide roll 53 to between intermittently operating feed rollers 55 and 56. The feed roller 55 is fast to the end of a shaft 57 journaled in standards 58 and 59 on the plate 8, the shaft 57 having a pinion 60 meshing with a like size pinion 61 on a shaft 62 passing relatively loosely through the standard 59 and through a bearing sleeve 63 having a stem 64 passing through an angular extension 65 of the standard 59. A thumb nut 66 is threaded onto the stem 64 and is adapted to raise and lower one end of the shaft 62, a spring 67 being interposed between the extension 65 and the sleeve 63 and serving to press the roller 56, which is fast on the shaft 62, toward the roller 55, so that the roller 55 will coöperate with the roller 56 to grip the body web therebetween. Intermittent rotary movement of the rollers 55 and 56 is accomplished through the instrumentality of a pinion 68 fast to the shaft 57 and meshing with a large gear 69 rotatably mounted on a short shaft 70 journaled in a bracket 71, a ratchet wheel 72 being fast to the pinion 69 and rotated step by step by a pawl 73 carried by a crank 74 journaled on the end of the shaft 70 and oscillated by an adjustable connecting rod 75 pivotally connected to one arm 76 of a rock lever fulcrumed on a bracket 77, the other arm 78 of the rock lever being pivotally connected to a cam rod 79 carrying an anti-friction roller 80 coöperating with a cam 81 on the cam shaft 25. The contour of the cam 81 is such as to rotate the rollers 55 and 56 step by step, or intermittently, in a direction to feed the body web, drawing the same from the supply roll, past the slack producing device and over the guide roll, and delivering the advance end of the body web into position opposite the table, and the cover web lying thereon, so that the end of the body web may be pressed against the glued face of the cover web opposite the table 45. In the preferred and illustrated embodiment of the invention, the cover web and the body web approach the table so that the longitudinal extent of one web is at an angle to the longitudinal extent of the other, which arrangement assists in keeping the webs apart until they arrive at the table and facilitates the production and assembly on the table of blanks of the respective webs. At this point it is convenient to refer to a guiding element which operates to space the face of one web from the adjacent face of the other web as the webs assume superposed, or opposite position, relative to the table. The cover web being glued on its upper face, and in the present embodiment the glue being preferably moist at the time when the body web is fed over the cover web, this guiding device is employed to guide the body web and space it from the glued face of the cover web while being fed into said superposed position. A severing device comprising a cutter 82 is disposed to reciprocate transversely of the plane of the body web so as to sever said web, and the guiding device referred to, in the present embodiment, is movable with this severing device and comprises an upper portion, or face 83, of the support for the cutter 82, over which face the end of the body web passes on its passage to the table 45. As the support of the cutter rises to place the cutter in initial position, the face 83 engages the body web adjacent the table and lifts it so that as the end of this web passes across the table it makes no substantial contact with the glued face of the cover web.

It will be understood that the amount of rotation of the feed rollers 55 and 56 is predetermined so as to feed the correct amount of body web onto the table, and to place the front edge of the body web in predetermined position relative to one of the longitudinal edges of the cover web, preferably as illustrated in Fig. 17. The ends of the webs having been positioned as thus explained, are pressed together so that the glue causes them to firmly adhere, and then the body web is severed, leaving a blank of the body web opposite the table and adhering to the unsevered cover web. This blank is then engaged and fed away from position opposite the table and toward the former to be subsequently folded into a shell. Immediately above the table is a feeding and pressing device comprising a plate 84 having a flat underface provided with devices adapted to engage the body-blank so as to move the blank upon movement of the plate longitudinally of the table. In the present embodiment the body-blank engaging devices are composed of teeth, as fine sharply pointed pins 85, extending in a direction transversely of the table and adapted to penetrate the body-blank but not to pass entirely therethrough. When these pins have become seated in the blank, the flat face of the plate 84 rests upon the blank and coöperates with the upper surface of the table to press the blank against the cover web. The plate 84 is moved toward and from the table and also in a plane parallel thereto by mechanism arranged as follows: the numeral 86 indicates a supporting member which is slidably mounted in a guideway at one side of the standard 87 supporting the table 45. The support 86 has an arm 88 overhanging the table, and an undercut groove 89 in the plate 84 slidably engages a dovetail tongue 90 depending from the arm 88. The plate 84 has an extended portion 91 which is connected to an arm 92 of a rock shaft 93 by means of a rod 94 and links 95 and 96. The shaft 93 is journaled in a bracket 97 fastened on the top of the main plate 8, said shaft 93 extending beneath the plate 8 and having an arm 98 pivotally connected to a rod 99, in turn having a slot 100 through which the cam shaft 25 passes, said rod having an anti-friction roller 101 coöperating with a cam 102 on the shaft 25, said cam being shaped to move the plate 84 at the proper times and the proper distance longitudinally of the table 45. The movement of the plate 84 is in a line parallel to the longitudinal extent of the cover web, and it will now be seen that when the teeth 85 engage one of the elements to be moved, in this instance the body-blank, the movement of the plate 84 will not only serve to move the body blank toward the former or mandrel, but also to advance the cover web and feed a succeeding portion of this latter web onto the table. The movement of the plate 84 transversely of the surface of the table 45 and of the blanks or webs thereon is to enable the plate 84 to return to initial feeding position without moving the web elements, and such movement of the plate 84 is accomplished by means of a cam 101' on the shaft 25, which coöperates with an anti-friction roller 102' on a rock lever 103, in turn connected with the support 86 through an adjustable rod 104 and connecting links 105.

The end of the body web having been fed as described into superposed relation with the end of the cover web lying on the table 45, and the plate 84 having descended and pressed the ends of the webs together, with the teeth 85 penetrating the body web, the plate and teeth coöperating with the table to firmly hold the ends of the webs in superposed relation, the body web is severed to leave a body-blank lying upon the cover web, as before stated. The preferred form of severing mechanism comprises the reciprocatory cutter 82 removably fastened to a vertically reciprocatory support 106, and spaced from the upper face 83 of said support to permit the passage of the body web. The support 106 is guided on a side of the standard 87 opposite the guideway for the support 86 and is operated through the instrumentality of a stem 107 depending from the support 106, said stem being guided in an opening in the plate 8 and connected to one end of a rock lever 108 by a link 109, the other end of the rock lever having an anti-friction roller 110 coöperating with a cam 111 on the shaft 25. The cutter 82 is a shear blade and coöperates with another blade, provided by one edge 112 of the table, to sever the body web.

The body web having been severed, longitudinal movement of the plate 84 advances or feeds the body-blank and the adhering cover web in the direction of a former or mandrel, the advancing edge of these elements being moved into position to be seized or gripped by a mechanism adapted to further feed the composite blank. Before the latter mechanism operates to feed, the cover web is severed. The feeding throw of the cover web feeding device 84 is sufficient to advance the body-blank beyond the forward edge of the table, leaving a portion of the cover web extending between the trailing, or rear, edge of the body-blank and the table to form the flap or extended portion 6 of a cover-blank. The elements having assumed this position, the cover web is severed by means of a cutter 113 which reciprocates transversely of the plane of the cover web and the table 45, coöperating with the front edge of this table in the severing operation. Preferably the cutter 113 is a shear blade mounted on the same support as the cutter 82 so that the single reciprocatory support 106 serves to operate both cutters, these cutters being disposed at angles to each other. When the elements are advanced by the plate 84, the front edge of the cover web and of the body-blank thereon is introduced between a feeding device which is adapted to further feed the elements after the severing of the cover web. In the present embodiment these further feeding elements are spaced from the table 45, the cutter 113 operating in this space, this as it were supplemental or auxiliary feed device preferably comprising a pair of gripper rollers 114, 115 spaced from the table in line with the longitudinal reciprocatory movement of the plate 84. The numeral 116 indicates an upstanding bracket secured to the plate 8 and comprising a guideway 117 extending transversely of the axes of the rollers 114 and 115, within which guideway reciprocates a sliding member 118 provided with an elongated bearing portion 119 through which passes one end of a feed roller shaft 120, the other end of said shaft being journaled in a plate 121 guided in a channel 122 of a bracket 123 affixed to the upstanding bracket 116. Rotatably mounted between upstanding portions of the bracket 123 is the feed roller 114. The feed roller 115 comprises a gripper surface, as a rubber sleeve, rotatable with the shaft 120. The sliding member 118 has a bent arm 124 extending around one of the walls of the guideway 117 and supporting a stud 125 on which is rotatably mounted a gear member 126, said gear member having a depending slotted arm 127 for the adjustable connection of a pivot pin 128 to which is pivotally connected one end of a rod 129, the other end of the rod being pivoted for vertical movement to an arm 130 of a vertical shaft 131 passing through the frame and having a lower arm 132 operatively connected by a rod 133 to a cam 134 on the shaft 25, a spring 135 being employed to rock the shaft 131 in one direction as permitted by the cam 134. The shaft 120 carries a pinion 136 which is adapted to mesh with the gear member 126, and vertically reciprocatory movements are communicated to the shaft 120 by a rod 137 connected to an arm 138 of the slide 118, said arm passing through a slot 139 at the back of the guideway. The rod 137 extends through plate 8 and is connected to a rock lever 140 by a link 141, the rock lever being operated by a cam 142 on the shaft 25. The operating mechanism of the supplementary feed roller device is so constructed and proportioned that the slide 118 moves the roller 115 from the roller 114 in order that the advancing body-blank and cover web may be received therebetween, the roller 115 thereafter descending and coöperating with roller 114 to grip these elements, the pinion 136 at the same time meshing with the gear member 126. While these feed rollers are in gripping position, the cutter 113 operates and after the cutting operation the gear member 126 is rotated in a direction to cause rollers 114 and 115 to move the composite blank into folding position opposite a face of a former or mandrel 143. It will be understood that the roller 115 rises and falls alternately and rotates intermittently in opposite directions, but that its feeding action is due to the rotary movement in but one direction.

In the present embodiment the composite-blank is positioned relative to the advancing face of the mandrel 143 so that an intermediate narrow section 144 thereof (Fig. 17) will be placed opposite said face and the feed rollers retain grip upon the blank until the mandrel takes hold thereof. The mandrels or formers are constructed to pneumatically grip the composite blank, and inasmuch as the construction and operation of the mandrels is practically like the construction and operation of the mandrels disclosed in a co-pending application filed July 9, 1914, Serial No. 849,869, patented April 18, 1916, No. 1,179,959, only brief reference thereto will be made herein. Each of the four mandrels has two independent passageways 150 and 151 opening into the advancing, or front, and trailing, or rear, faces thereof at 152 and 153. The face of the hub to which the mandrels are connected is plain and each passageway 150 and 151 opens into said face by means of passageways 154 and 155. An oscillatory turret valve member 156 coöperates with the outer ends of the passageways 154 and 155 to control passageway therethrough, the member 156 having a chamber which communicates with an air pipe 157 in turn communicating with the pipe 18 leading to the vacuum tank 15. The mandrels assume four different positions 90 degrees spaced from each other, and just after one of them reaches the position for reception of the composite-blank the valve member 156 is operated to establish communication between the exhaust and the advancing face of the mandrel so as to cause the composite-blank which has been fed into position opposite said face to be pneumatically gripped to said face. This mandrel then moves to a lower position opposite certain folding devices, whereupon the trailing face of the mandrel is pneumatically energized, so that when a blank is folded thereagainst it will be pneumatically held. The mandrel then moves upwardly into position in line with certain tray feeding devices and in this position the pneumatic grippers are deënergized so as to permit the free stripping of the shells therefrom. The valve member 156 is operated through the instrumentality of a cam 158, a rock lever 159 and a lever 160 connected to an arm 161 of the member 156.

The composite-blank having been pneumatically gripped to the former as described, the latter makes a downward movement and coöperates with certain fingers of a folding device which fold the blank up against the lateral faces of the former. This folding device is illustrated clearly in Fig. 13 and comprises a pair of fingers 162 and 163 between which the former moves before coming to rest in its lowermost position. When the former arrives at its lower position of rest the folding fingers will coöperate with the former to hold the sides 164 and 165 of the blank in folded position, these fingers lying in a plane slightly inside of the trailing or rear face of the former. The fingers are then moved transversely of the plane of movement of the former, first in one direction and then the other, the movement in the first direction folding the end section 166 of the composite blank against the trailing face of the former, and the movement in the opposite direction folding the flap or extended portion 6 of the composite blank over the joint formed by the juxtaposition of the edges 4 and 5 of the blank and onto the outer face of the section 166, thus completing the shell. The embodied mechanism for moving the fingers 162 and 163 as stated comprises a rectilinearly slidable support 167 moving in a guideway 168 on the plate 8 and reciprocated transversely of the path of the formers by a link 169 pivotally connected to a rock shaft 170, in turn rocked through the instrumentality of a connecting rod 171 adjustably connected to a crank disk 172 on a shaft 173 journaled in a bearing 174, the shaft 173 having a gear 175 adapted to mesh with the teeth 34 of the mutilated gear which drives the mandrel shaft. The number of teeth in the gear 175 relative to those of the mutilated gear 34 is such as to completely rotate the shaft 173 once for every rotation of the mutilated gear 34. The support 167 has an undercut slot extending in a plane parallel to the path of movement of the formers, and a finger carrier 176 has a tongue engaging this slot, this carrier being pressed in the direction of the lowermost former by a spring 177 abutting the carrier and a plate 178 on the support 167. Movement of the carrier 176 under the influence of the spring 177 in a direction to press the folded sections 166 against the trailing face of the former may be limited by a stop consisting of an adjustable screw 179 in a plate 179' on the carrier 176. The spring 177 presses the carrier 176 to extreme lateral position, in which position a plane tangent to the two fingers is slightly inside of the plane of the trailing face of the former. The folding fingers are preferably rollers mounted on stems 180, one of these stems being fast to the carrier 176, and the other mounted on a member 181 slidably adjustable in a slot 182 in the carrier so as to permit the distance between the fingers to be accurately set.

The numeral 183 indicates a stripper which reciprocates alongside the former which is in position opposite to be moved into assembly relation with a tray, this stripper being reciprocated, its movement in one direction shoving the shell from the former over the tray, and its movement in the other direction being for the purpose of returning it to position to strip a shell from the next former. The reciprocatory movements of the stripper 183 are effected by link 184 connected to an arm 185, on a rock shaft 186 journaled in a bracket 187 on the plate 8, said shaft 186 being operated by a cam 188 through the instrumentality of a connecting link 189. The movement of the stripper in one direction is effected positively by the cam 188 while its movement in the opposite direction is effected by a spring 190 coiled around the shaft 186, one end thereof being connected to the shaft bracket and the other end adjustably connected to the shaft 186 by the nut 191 threaded on shaft 186, adjustment of the nut serving to adjust the tension of said spring. Preferably the tension spring is directed to urge the stripper in a direction to remove the shells from the former and assemble the same with the trays.

When the composite blank has been folded around the former, as explained hereinbefore, it becomes a shell or case which is adapted to contain a tray or drawer, and one of the objects of the present invention is to efficiently and automatically assemble these box members with each other. The construction and operation of the tray assembling device is similar in part to the tray feeding device disclosed in the patent above referred to. One of the trays suitable for assembly with the shells is shown in Fig. 18 partly projecting from the shell. An operator places the trays on edge on a belt conveyer 192, said belt running over the bottom 193 of a trough comprised of upstanding walls 194 adapted to guide the boxes successively as they are fed by the belt. The belt is driven by a pulley 195 on a shaft 196, and is coupled by a belt 197 with a pulley 198 on the cam shaft 25, so that the operation of the cam shaft will result in a continuous travel of the belt 192. It will of course be understood that the belt 192 is supported at its other end by an idle pulley complementary to the pulley 195.

The belt 192 passes beneath upstanding guide walls 199 of a supporting guideway extending transversely of the direction of feed of the trays by the belt, and as the trays assume position opposite the opening to this transverse guideway a reciprocatory pusher 200 is operated to advance the trays one by one into the transverse guideway, each tray pushing the one ahead of it and eventually the foremost tray arrives in position opposite the opening 201 directly opposite the end of the former or mandrel, when the same is in stripping position and in alinement with the longitudinal extent of such former, so that when the shell is stripped or pushed from the mandrel said shell will pass over or telescope with the tray which is in position opposite the opening 201. The pusher 200 comprises a plate which extends forwardly from a reciprocatory slide 202 and also comprises a lateral stop portion 203 which is adapted to prevent the adjacent tray on the belt 192 from being fed in front of the pusher during the feeding movement of a preceding tray into the transverse guideway. Feeding operation of the slide 202 is effected through a connecting rod 203' pivoted to an arm 204 of a rock shaft 205 having another arm 206 connected to a follower 207 having a roller 208 coöperating with a cam 209 on the cam shaft 25. The slide 202 is positively moved by the cam in a direction to feed the trays, a spring 210 returning the same.

Overhanging the conveyer trough is a device adapted to prevent the boxes falling over as they arrive opposite to and while in the transverse guideway. This device comprises a plate 211 slightly upturned at its end adjacent the opening 201 and also immediately above the trough, this plate extending over the conveyer trough and over the transverse trough at the position opposite the opening 201. The plate or wall 211 is pivoted to the sides of the transverse trough at 212 and is connected to a bottom plate or wall 213, also pivotally connected to the sides of the transverse trough, as at 214, the plate 213 forming the bottom of the transverse trough and supporting the trays in their passage from the conveyer trough to assembly position opposite the opening 210. A spring 215 connects the plates 211 and 213 at the further end and causes them to grip the trays, and a spring 216 is connected to the plate 211 and to the frame to definitely position the uppermost plate relative to the opening 201 and thereby position the trays in predetermined position relative thereto. A spring detent finger 217 extends in advance of the plate 211 to yieldingly limit the advance of the trays. A shell having been stripped from the former, will be pushed by the stripper through the opening 201 and will telescopically engage over the tray in position opposite said opening. The next feed of trays by the pusher will advance the assembled tray and shell, the resilient stop 217 giving way, whereupon the assembled elements will drop through the chute 218 into a receiving trough 219 and in front of an ejector 220 mounted on a reciprocatory slide 221 having pin and slot engagement with a lever 222 in turn connected by a rod 223 to an arm 227 on the rock shaft 205. Movement of the ejector 220 will push the assembled trays and shells along the trough 219 and eventually into position to be removed from the machine.

The forward end of the tray pusher 200 is adapted to grip the tray so as to more efficiently control its movement and position, and to this end the forward end of the pusher is faced with a metallic plate 300 having a number of perforations 301 communicating with a chamber in the piece 200, this perforated face being adapted to serve as a pneumatic gripper. A short pipe 302 leads into this chamber, and a flexible hose or pipe 303 connects the pipe 302 with the open end of the metallic air-exhaust pipe 20 projecting above the main plate of the frame of the machine. The valve 21 is operated to open the passage to the tray pusher and to energize the gripper face at the time a tray assumes position in front of the perforated plate 300, so that the tray will be pneumatically gripped to the pusher. The pusher advances to place the tray opposite the opening 201 and accurately opposite the shell to be stripped from the turret arm or former. This pneumatic gripper preferably releases the tray just before the shell engages the tray, although the valve 21 might be timed to deënergize the gripper just after the tray has engaged the box. The valve 21 is operated from the elevating device of the cover web feed device through the instrumentality of an arm 307 on the valve, a rod 308 pivoted to said arm, and a rock lever 309, to one arm of which rod 308 is connected, the other arm of lever 309 being pivotally connected to the reciprocatory support 85.

By the above described construction are accomplished, among others, the objects hereinbefore referred to. The operation thereof will be clear, but may be briefly summarized as follows: A roll of cover web and a coil of body web are threaded into the machine, as explained, and as generally illustrated in Figs. 2 and 4, the webs being directed toward the table 45, preferably at right angles to each other. The upper face of the end of the cover web lying on the table 45 will be coated with glue, the plate 84 will descend, the teeth 85 penetrating the end of the body web, and the ends of the two webs will be pressed together. While pressed together the cutter 82 descends and severs a body-blank from the body web. The plate 84 then advances in the direction of the former, carrying the body-blank therewith, and thus feeding the cover web which adheres to the body-blank. The distance of this advance of the plate 84 will be sufficient to position the advance end of the body blank between the feed rollers 114 and 115, which will then be in separated position. These rollers then come together to grip the body-blank and the cover web attached thereto, whereupon the cutter 113 descends and severs the cover web while this web and the body-blank are gripped between the feed rollers 114 and 115. Meantime the plate 84 will have risen and returned to initial feeding position and the body web will have been advanced to place a succeeding end thereof over the succeeding portion of the cover web which has been drawn over the table. The plate 84 then descends and the operations just described are repeated. The composite-blank which has been formed and which is in the grip of the rollers 114 and 115 will then be advanced by these rollers into position opposite the advance face of one of the formers and will be pneumatically gripped to such former before the rollers 114 and 115 are again separated. The downward movement of the former causes it to pass between the folding fingers 162 and 163 to fold the extending ends of the composite-blank against the lateral faces of the former, whereupon the fingers are reciprocated, motion in one direction folding the section 166 of the composite-blank against the face of the former, where it will be pneumatically gripped thereto, and motion of the fingers in the opposite direction folding the flap 6 over the joint and against the outer face of the section 166. Fingers 162 and 163 not only fold the elements, but press them as well, as will be obvious from the construction described. The former then makes another movement of 90 degrees and is positioned opposite the opening 201, where the shell is stripped from the former and assembled with the tray in the manner explained in connection with the last part of the description relating to the construction of the tray feeding and assembly devices.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:—

1. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member having teeth adapted to penetrate the element to be moved, and means adapted to sever the adhering web to leave a blank thereof adhering to the other blank.

2. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, a plate adapted to press the blank against the end of the other web, said plate having teeth adapted to penetrate the element to be moved, means adapted to move said plate to feed a succeeding portion of the adhering web onto the table, and means adapted to sever the adhering web to leave a blank thereof adhering to the other blank.

3. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, a plate adapted to press the blank against the end of the other web, said plate having teeth adapted to penetrate the element to be moved, means adapted to move said plate to feed a succeeding portion of the adhering web onto the table, means adapted to sever the adhering web to leave a blank thereof adhering to the other blank, and means adapted to move said plate toward and from said table.

4. In an apparatus of the character described, in combination, a table on which the end of a web is adapted to lie, means adapted to feed the end of a second web into position opposite the table and the web thereon, one of said webs being adhesive coated on a face adjacent the other, means adapted to space the face of one web from the adjacent face of the other web opposite said table as the webs assume said opposite position, means adapted to sever one of said webs to leave a blank of web opposite said table, means adapted to press the blank against the end of the other web, means adapted to move the blank from the table in a direction to feed a succeeding portion of the adhering web onto the table, and means adapted to sever the adhering web to leave a blank thereof adhering to the other blank.

5. In an apparatus of the character described, in combination, a table on which the end of a web is adapted to lie, means adapted to feed the end of a second web into position opposite the table and the web thereon, one of said webs being adhesive coated on a face adjacent the other, movable means adapted to guide the face of one web away from the adjacent face of the other web while being fed into said opposite position, means adapted to sever one of said webs to leave a blank of web opposite said table, means adapted to press the blank against the end of the other web, means adapted to move the blank from the table in a direction to feed a succeeding portion of the adhering web onto the table, and means adapted to sever the adhering web to leave a blank thereof adhering to the other blank.

6. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table comprising a reciprocatory cutter movable transversely of the plane of this web, means adapted to press the blank against the end of the other web, means adapted to move the blank from the table in a direction to feed a succeeding portion of the adhering web onto the table, and means adapted to sever the adhering web to leave a blank thereof adhering to the other blank comprising a reciprocatory cutter movable transversely of the plane of this web, said severing devices comprising a single reciprocatory support on which said cutters are carried.

7. In an apparatus of the character described, in combination, a table on which the end of a web is adapted to lie, means adapted to feed the end of a second web into position opposite the table and the web thereon, one of said webs being adhesive coated on a face adjacent the other, means adapted to space the face of one web from the adjacent face of the other web opposite said table as the webs assume said opposite position, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member having teeth adapted to penetrate the element to be moved, and means adapted to sever the adhering web to leave a blank thereof adhering to the other blank.

8. In an apparatus of the character described, in combination, a table on which the end of a web is adapted to lie, means adapted to feed the end of a second web into position opposite the table and the web thereon, means to apply adhesive to one web on a face adjacent the other, means adapted to sever one of said webs to leave a blank of web opposite said table comprising a reciprocatory cutter movable transversely of the plane of this web, means adapted to press the blank against the end of the other web, means adapted to move the blank from the table in a direction to feed a succeeding portion of the adhering web onto the table, and means adapted to sever the adhering web to leave a blank thereof adhering to the other blank, comprising a reciprocatory cutter movable transversely of the plane of this web, said severing devices comprising a single reciprocatory support on which said cutters are carried.

9. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member having teeth adapted to penetrate the element to be moved, a feeding device spaced from said reciprocatory member adapted to further move said element, and means adapted to sever the adhering web to leave a blank thereof adhering to the other blank.

10. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member having teeth adapted to penetrate the element to be moved, a feeding device spaced from said reciprocatory member adapted to further move said element, and means adapted to sever the adhering web to leave a blank thereof adhering to the other blank, one of said severing means being disposed to operate within said space.

11. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member adapted to engage and feed the element to be moved, a pair of gripper feed rollers spaced from said reciprocatory member adapted to further move said element, means adapted to effect oscillatory movement of one of said rollers, and means adapted to sever the adhering web to leave a blank thereof adhering to the other blank, one of said severing means being disposed to operate within said space.

12. In an apparatus of the character described, in combination, a table on which the end of a web is adapted to lie, means adapted to feed the end of a second web into position opposite the table and the web thereon, one of said webs being adhesive coated on a face adjacent the other, means adapted to sever one of said webs to leave a blank of web opposite said table, means adapted to press the blank against the end of the other web, means adapted to move the blank from the table in a direction to feed a succeeding portion of the adhering web onto the table comprising a reciprocatory member having teeth adapted to penetrate and feed the element to be moved, a pair of gripper feed rollers spaced from said reciprocatory member adapted to further move said element, and means adapted to sever the adhering web to leave a blank thereof adhering to the other blank, one of said severing means being disposed to operate within said space.

13. In an apparatus of the character described, in combination, means adapted to feed a pair of webs and assemble the ends thereof in superposed relation with the interposition of adhesive comprising a stationary table to support the web ends, means adapted to sever said webs on lines to produce a composite blank composed of said superposed ends, means adapted to fold said composite blank into a shell, a reciprocatory gripper adapted to move the superposed portions of the webs in the direction of said folding means, and a pair of gripper rollers adapted to further feed the composite blank into position to be folded.

14. In an apparatus of the character described, in combination, means adapted to feed a pair of webs and assemble the ends thereof in superposed relation with the interposition of adhesive comprising a stationary table to support the web ends, means adapted to sever said webs on lines to produce a composite blank composed of said superposed ends, and means adapted to fold said composite blank into a shell comprising a plurality of movable formers around which successive composite blanks are to be folded, a reciprocatory gripper adapted to move the superposed portions of the webs in the direction of the plane of movement of said formers, and a pair of gripper rollers adapted to further feed the composite blank into folding position relative to one of said formers.

15. In an apparatus of the character described, in combination, a stationary table, a pressing member having teeth extending toward the plane of the table, means adapted to reciprocate said pressing member toward and from and longitudinally of the table, and a severing device comprising cutters disposed at an angle to each other and adapted to move transversely of the table.

16. In an apparatus of the character described, in combination, a stationary table, a pressing member having teeth extending toward the plane of the table, means adapted to reciprocate said pressing member toward and from and longitudinally of the table, a severing device comprising cutters disposed at an angle to each other and adapted to move transversely of the table, and means adapted to time the operation of the cutters relative to that of said pressing member.

17. In an apparatus of the character described, in combination, a stationary table, a pressing member having teeth extending toward the plane of the table, means adapted to reciprocate said pressing member toward and from and longitudinally of the table, a severing device comprising cutters disposed at an angle to each other and adapted to move transversely of the table, means adapted to time the operation of the cutters relative to that of said pressing member, and a web guide movable with said severing device.

18. In an apparatus of the character described, in combination, a stationary table, a feeding member adapted to reciprocate both longitudinally and transversely of the table, a second feeding member comprising a pair of gripper rollers spaced from said table in line with the longitudinal reciprocatory movement of said first-mentioned feeding member, means adapted to rotate one of said rollers intermittently, and means adapted to move one of said rollers toward and from the other.

19. In an apparatus of the character described, in combination, a stationary table, a feeding member adapted to reciprocate both longitudinally and transversely of the table, a second feeding member comprising a pair of gripper rollers spaced from said table in line with the longitudinal reciprocatory movement of said first-mentioned feeding member, a sliding member on which one of said rollers is journaled, a guideway for said slide extending transversely of the axes of said rollers, a gear member carried by said slide, a pinion on said last-mentioned roller engaging said gear member, means adapted to oscillate said gear member, and means adapted to reciprocate said slide.

20. In an apparatus of the character described, in combination, a table on which the end of a web is adapted to lie, means adapted to feed the end of a second web at an angle to the longitudinal extent of the first-mentioned web into position opposite the table and the web thereon, one of said webs being adhesive coated on a face adjacent the other, means adapted to space the face of one web from the adjacent face of the other opposite said table as the web assumes said opposite position, means adapted to sever one of said webs to leave a blank of web opposite said table, means adapted to press the blank against the end of the other web, means adapted to move the blank from the table in a direction to feed a succeeding portion of the adhering web onto the table, comprising a reciprocatory member having teeth adapted to penetrate said blank, a pair of gripper feed rollers movable toward and from each other, adapted to further move said blank, one of said rollers having an oscillatory rotary movement and means adapted to sever the adhering web to leave a blank thereof adhering to the other blank.

21. In an apparatus of the character described, in combination, a stationary table on which the end of a web is adapted to lie, means adapted to feed the end of a second web at an angle to the longitudinal extent of the first-mentioned web into position opposite the table and the web thereon, one of said webs being adhesive coated on a face adjacent the other, movable means adapted to space the face of one web from the adjacent face of the other opposite said table as the web assumes said opposite position, means adapted to sever one of said webs to leave a blank of web opposite said table, means adapted to press the blank against the end of the other web, means adapted to move the blank from the table in a direction to feed a succeeding portion of the adhering web onto the table, and means adapted to sever the adhering web to leave a blank thereof adhering to the other blank.

22. In an apparatus of the character described, in combination, an intermittently movable angular former, means adapted to partially fold a blank around said former comprising a pair of folding fingers between which said former moves to fold the blank, the surfaces of said fingers being disposed inside of the trailing face of said former when the former is at rest after said folding, and means adapted thereafter to reciprocate said fingers transversely of the plane of the path of said former to complete the folding of the blank, comprising a rectilinearly movable finger support.

23. In an apparatus of the character described, in combination, an intermittently movable angular former, means adapted to partially fold a blank around said former comprising a pair of folding fingers between which said former moves to fold the blank, the surfaces of said fingers being disposed inside of the trailing face of said former when the former is at rest after said folding, means adapted thereafter to reciprocate said fingers transversely of the plane of the path of said former to complete the folding of the blank, comprising a rectilinearly movable finger support, and means adapted to yieldingly press said fingers transversely of said face.

24. In an apparatus of the character described, in combination, an intermittently movable angular former, means adapted to partially fold a blank around said former, comprising a pair of folding fingers between which said former moves to fold the blank, the surfaces of said fingers being disposed inside of the trailing face of said former when the former is at rest after said folding, means adapted thereafter to reciprocate said fingers transversely of the plane of the path of said former to complete the folding of the blank, comprising a rectilinearly movable finger support, means adapted to yieldingly press said fingers transversely of said face, and a stop to limit said last-mentioned transverse movement.

25. In an apparatus of the character described, in combination, an intermittently movable angular former, means adapted to partially fold a blank around said former, comprising a pair of folding fingers between which said former moves to fold the blank, the surfaces of said fingers being disposed inside of the trailing face of said former when the former is at rest after said folding, means adapted thereafter to reciprocate said fingers transversely of the plane of the path of said former to complete the folding of the blank, comprising a rectilinearly movable finger support, and means adapted to yieldingly press said fingers transversely of said face, one of said fingers being adjustable toward and from the other.

26. In an apparatus of the character described, in combination, a fixed guideway, a support movable in said guideway, a finger carrier guided on said support for movement transversely of the movement of the latter, a spring adapted to urge said carrier in one direction relative to said support, a stop in the path of said carrier to limit its movement under the influence of said spring, and a pair of folding fingers mounted on said carrier.

27. In an apparatus of the character described, in combination, a fixed guideway, a support movable in said guideway, a finger carrier guided on said support for movement transversely of the movement of the latter, a spring adapted to urge said carrier in one direction relative to said support, a stop in the path of said carrier to limit its movement under the influence of said spring, a folding finger fixed to said carrier, a member mounted on said carrier and adjustable toward and from said fixed finger, and a folding finger carried by said member.

28. In an apparatus of the character described, in combination, means adapted to automatically dispose shells successively in predetermined position, means adapted to move a tray, comprising a pusher having a pneumatic gripper face, means adapted to automatically move trays successively into position opposite said pneumatic gripper face, means adapted to energize said gripper to cause the tray in position opposite said face to be pressed against said face, and means adapted to cause relative movement between said pneumatically held tray and a shell in said predetermined position to assemble said tray and shell, one within the other.

29. In an apparatus of the character described, in combination, means adapted to automatically dispose shells successively in predetermined position, means adapted to move a tray, comprising a pusher having a pneumatic gripper face, means adapted to automatically move trays successively into position opposite said pneumatic gripper face, means adapted to energize said gripper to cause the tray in position opposite said face to be pressed against said face, means adapted to cause relative movement between said pneumatically held tray and a shell in said predetermined position to assemble said tray and shell, one within the other, and means adapted to deënergize said gripper face prior to the completion of said assembly movement.

30. In an apparatus of the character described, in combination, means adapted to automatically dispose shells successively in predetermined position, means adapted to move a tray, comprising a box pusher having a pneumatic gripper face, means adapted to automatically move trays successively into position opposite said pneumatic gripper face, means adapted to energize said gripper to cause the tray in position opposite said face to be pressed against said face, means adapted to cause relative movement between said pneumatically held tray and a shell in said predetermined position to assemble said tray and shell, one within the other, and means adapted to deënergize said gripper face prior to engagement of said shell and tray.

31. In an apparatus of the character described, in combination, means adapted to move a shell, a pusher having a pneumatic gripper face adapted to retain a tray, means adapted to move a tray into position opposite said pneumatic gripper face, means adapted to move said pusher to place said tray in position to be inclosed by said shell when the latter is moved to assemble the same therewith, and means adapted to energize said gripper face during the tray positioning movement of said pusher.

32. In an apparatus of the character described, in combination, means adapted to move a shell, a pusher having a pneumatic gripper face adapted to retain a tray, means adapted to move a tray into position opposite said pneumatic gripper face, means adapted to move said pusher to place said tray in position to be inclosed by said shell when the latter is moved to assemble the same therewith, means adapted to energize said gripper face during the tray positioning movement of said pusher, and means adapted to deënergize said gripper face before the completion of the assembly movement of said shell.

33. In an apparatus of the character described, in combination, a table on which the end of a web is adapted to lie, means adapted to feed the end of a second web into position opposite the table and the web thereon, means adapted to sever one of said webs to leave a blank of web opposite said table, means adapted to press the blank against the end of the other web, means adapted to move the blank from the table in a direction to feed a succeeding portion of the other web onto the table comprsing a reciprocatory member having teeth adapted to penetrate the element to be moved, and means adapted to sever the other web to leave a blank thereof opposite to the other blank.

34. In an apparatus of the character described, in combination, means adapted to feed a pair of webs and assemble the ends thereof in superposed relation with the interposition of adhesive, comprising a stationary table to support the web ends, means adapted to sever said webs on lines to produce a composite blank composed of said superposed ends, means adapted to fold said composite blank into a shell, comprising a plurality of movable formers around which successive composite blanks are to be folded, a reciprocatory gripper adapted to move the superposed portions of the webs in the direction of the plane of movement of said formers, and a second reciprocatory gripper adapted to further feed the composite blank into folding position relative to one of said formers.

In testimony whereof I affix my signature, in the presence of two witnesses.

HAROLD CARLE.

Witnesses:
 LYDON C. PALMER,
 HAROLD C. COPPINS.

Copies of this patent may be obtained for five cents each, by addressing the "Commissioner of Patents, Washington, D. C."